Feb. 17, 1970  D. A. MELLICHAMP, JR  3,496,146
PREPARATION OF GLYCOL TEREPHTHALATE LINEAR POLYESTER
BY DIRECT ESTERIFICATION OF TEREPHTHALIC ACID
Filed Aug. 23, 1967
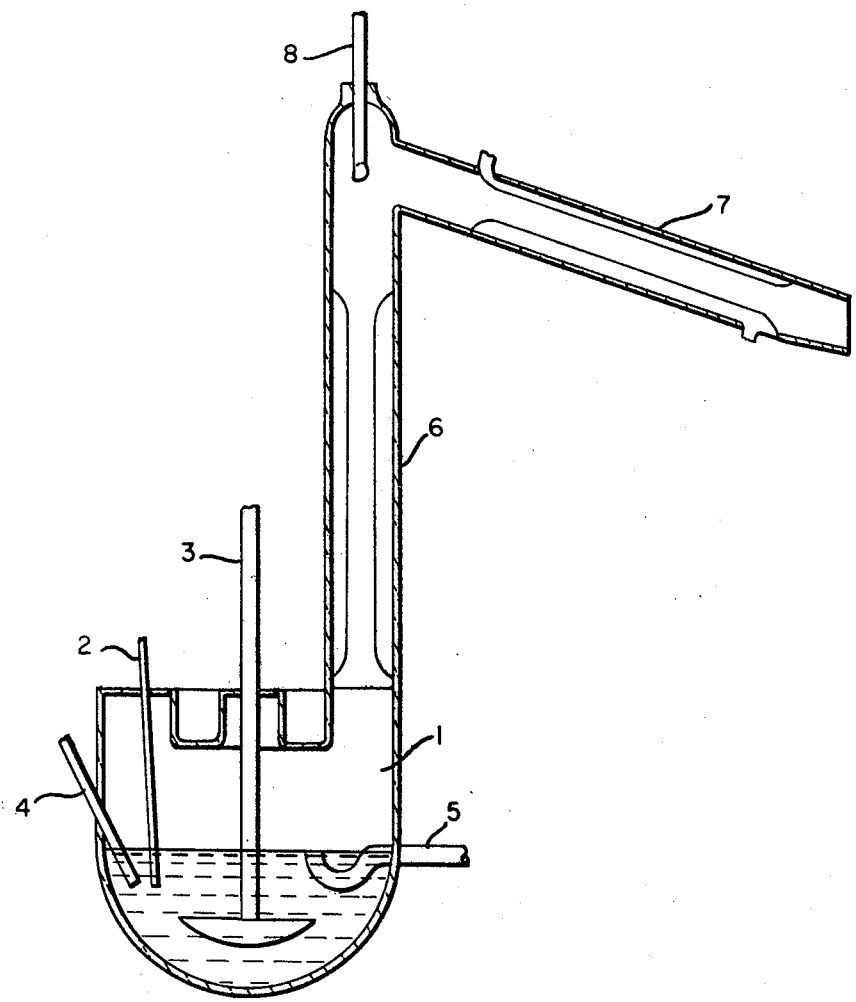
INVENTOR
DUNCAN A. MELLICHAMP
BY *Norris E. Ruckman*
ATTORNEY

United States Patent Office 3,496,146
Patented Feb. 17, 1970

3,496,146
PREPARATION OF GLYCOL TEREPHTHALATE LINEAR POLYESTER BY DIRECT ESTERIFICATION OF TEREPHTHALIC ACID
Duncan Adair Mellichamp, Jr., Santa Barbara, Calif., assignor to E. I. du Pont de Nemours and Company, Wilmington, Del., a corporation of Delaware
Filed Aug. 23, 1967, Ser. No. 662,626
Int. Cl. C08g 17/003, 17/08
U.S. Cl. 260—75     3 Claims

ABSTRACT OF THE DISCLOSURE

A high temperature process is disclosed for direct esterification of terephthalic acid with a glycol in low molecular weight polyester reaction medium. The effect of temperatures ranging from 280° to 350° C. is illustrated. Preferably a slurry of terephthalic acid in glycol is continuously fed into reaction product maintained at 305° to 315° C., and reaction product having a degree of polymerization of 6 to 20 is continuously withdrawn. Improvements in rate, conversion, and quality of product are disclosed.

---

This invention relates to the manufacture of linear polyesters. More particularly, it relates to a novel process for preparing polyesters by direct esterification of terephthalic acids with a glycol.

Synthetic linear polyesters derived from terephthalic acid and glycols have become well known articles of commerce, particularly in the form of fibers and films. Early commercial processes for manufacturing these polyesters were based upon the ester exchange reaction between dimethyl terephthalate and glycol to form the bis-glycol ester, which is then further polymerized. Although the alternative reaction between the free acid and glycol, called direct esterification, was known, it was not used because of the difficulty and expense of preparing free terephthalic acid with the high degree of purity necessary for the preparation of high polymers. More recently, highly purified terephthalic acid has become available at lower cost and interest in the direct esterification process has been revived, with many variations of the process being described in the patent literature. Among these variations are included the use of specific catalysts, the use of super-atmospheric pressure, the use of side-reaction inhibitors, the use of specific ratios of reactants, and the carrying out of the reaction in the presence of preformed terephthalate esters or low polymers thereof.

A review of the patent literature related to direct esterification reveals that the reactions have been carried out at temperatures considerably below 300° C. with substantially equimolar ratios of glycol and terephthalic acid. Although some of the patents disclose temperatures up to 300° C., there appears to be general agreement, both tacit and explicit, that decomposition becomes excessive at temperatures higher than about 285–300° C., resulting in undesirable side reactions and degradation processes which lead to polymers having poor color, poor chemical stability, and poor physical properties.

The present invention is an improvement in the process for the manufacture of glycol-terephthalate linear polyesters by direct esterification of terephthalic acid with a glycol and condensation polymerization of the ester to high molecular weight, fiber-forming polymer. The invention is concerned with esterification and preliminary polymerization to low molecular weight polyester reaction product in a combined step. The surprising discovery has been made that the combined step can be carried out at a high rate with high conversion of terephthalic acid to polyester of excellent quality in glycol-terephthalate polyester reaction medium maintained at a temperature above 300° C. When the reaction is carried out at about 305° to 315° C. and atmospheric pressure, the terephthalic acid rapidly dissolves in the polyester and a relatively high concentration of glycol can be maintained in solution to give at least 90% conversion of terephthalic acid to glycol-terephthalate polyester in less than 2 hours. When the reaction is carried out at temperatures of 315° to 330° C., a moderate amount of pressure, up to about 60 p.s.i.g., may be desirable to maintain a high concentration of glycol in solution. Side reactions leading to poor color, high ether content and/or high free carboxyl content are not encountered at temperatures below 330° C. Not only is the ultimate polymer color at least equal to commercial grade polyethylene terephthalate formed from the ester exchange reaction, but thermal stability of the polymer is considerably better than that of polymer derived from ester exchange.

According to the invention, linear terephthalate polyesters of high quality are produced by reacting free terephthalic acid with a glycol at a temperature of 303° to 330° C., in a medium which is a low-molecular weight linear terephthalate polyester having an average degree of polymerization of from 6 to 20. No catalyst is required and the reaction pressure may be atmospheric or super-atmospheric as desired. The low molecular weight polymer produced can then be further polymerized by heating under reduced pressure in the presence or absence of a polymerization catalyst in accordance with conventional processes.

The process of the invention may be carried out batchwise, but is most advantageously used as a continuous process in which a continuous slurry of terephthalic acid in glycol is fed into a heated reaction medium substantially consisting of low molecular weight terephthalate polyester, with part of the reaction product being continuously withdrawn for further condensation at a rate providing a holdup time of 0.5 to 2 hours in the reactor. In calculating the holdup time, the total weight of material in the reactor is divided by the weight of terephthalic acid per hour fed into the reactor.

In the continuous process, the mole ratio of glycol to terephthalic acid fed to the reactor may range from 1:1 to 8:1, with excess glycol being removed from the system by distillation. The lower feed ratios are preferred in order to reduce the amount of glycol vapor which must be handled. Feed and withdrawal rates and the quantity of reaction medium are adjusted to give the required holdup time needed to give good conversion. Conversions of about 88% to 97% may be obtained at holdup times of about 0.5 to 2 hours depending upon the feed ratio of the reactants and reaction temperature.

The invention will be more fully understood by referring to the illustrative examples and to the drawing, which is a schematic diagram of apparatus suitable for use in the invention.

Referring now to the drawing, the process is started by partially filling reaction vessel 1 with low molecular weight polyethylene terephthalate having a degree of polymerization in the range 6 to 20. This low molecular weight polymer is heated to the desired temperature above 300° C., as measured by thermocouple 2, and agitated by means of stirrer 3. A mixture of terephthalic acid and ethylene glycol is introduced continuously into the vessel through inlet tube 4 which opens under the surface of the low molecular weight polymer in the vessel. Continuously and simultaneously a portion of the reaction mixture is removed through outlet tube 5 in an amount equivalent to the terephthalic acid being introduced through the inlet tube. Water vapor produced by the reaction and excess glycol are removed through air cooled reflux condenser 6 and condensed in water cooled condensor 7. A thermometer 8 is provided in the head of the reflux condenser. The low molecular weight polymer removed through tube 5 is transferred to a conventional polymerization vessel where it is further polymerized at low pressure.

In the examples, numerical values for polymer color are obtained by grinding the polymer to pass a 20-mesh screen, spreading the ground polymer in a transparent sample holder, and then measuring light reflectance with a Hunter colorimeter. Values are obtained for total reflectance L and for yellowness b. A whiteness index W is calculated from the equation:

$$W = 0.01\ L(L - 5.72\ b)$$

In the example the term "relative viscosity" refers to the ratio of the viscosity of a 10% solution (2.15 gm. polymer in 20 ml. solvent) of polyethylene terephthalate in a mixture of ten parts of phenol and seven parts of 2,4,6-trichlorophenol (by weight) to the viscosity of the phenol-trichlorophenol mixture, per se, measured in the same units at 25° C. Relative viscosity is a measure of polymer molecular weight.

"Carboxyl number," as used in the examples, is determined by dissolving a sample of low molecular weight direct esterification product in heated dimethyl formamide and titrating with standard sodium hydroxide solution to a phenol red end point. The results are given in terms of equivalents per $10^6$ grams of product.

The free carboxyl content of polymer is determined by dissolving a sample of polymer in heated benzyl alcohol and titrating with standard sodium hydroxide to a phenol red end point. The results are reported as equivalents per $10^6$ gms. of polymer.

In the examples, "percent conversion" is a measure of the number of available carboxyl groups which have been reacted to form ester groups. Percent conversion is calculated from the expression:

$$\text{Percent conversion} = 100 - \frac{\text{Carboxyl number}}{\text{Percent terephthalyl} \times 1.52}$$

"Percent terephthalyl" is the weight percent of terephthalic acid radicals, i.e.

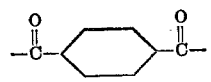

in a given sample. Percent terephthalyl is determined by saponifying a weighed sample of polymer in a known quantity of KOH solution and then back titrating the excess base with standard HCl, using a phenolphthalein end point.

"Percent free glycol" of the direct esterification product is determined by treating the product with a known excess of periodic acid until reaction with free glycol is complete, reacting the excess periodic acid with a potassium iodide solution to produce elemental iodine, and then titrating the iodine with standard sodium thiosulfate solution using a starch-iodine end point. The amount of periodic acid destroyed by the glycol is calculated and converted to percent free glycol based on the weight of the product sample. The values reported are approximate.

Polymer ether content is determined by analysis of infra-red absorption spectra of the polymer, utilizing the relative intensities of aliphatic and aromatic hydrogen bands in the spectra. The values in the examples are given as mole percent based upon the total number of moles of repeating units in the sample, and refer specifically to mole percent of aliphatic ether linkages.

EXAMPLE I

A continuous direct esterification process is conducted in a reactor similar to that shown in the drawing with the exception that inlet tube 4 is completely above the liquid level in the vessel. The vessel is charged with 232 ml. of molten low molecular weight polyethylene terephthalate (RV about 3), the tempertaure is adjusted to 303° C. with agitation, and then a mixture of ethylene glycol and terephthalic acid is fed into tube 4 in a mole ratio of 4:1. The feed rate is approximately 10.5 gms./min. No catalyst is added. The reaction product is removed from outlet tube 5 at a rate of 285 gms./hr. while at the same time vapor is being removed from condensor 7 at the rate of 350 gms./hr. Holdup time in the reaction vessel is approximately 0.9 hour.

The polymeric product is transparent and colorless, with no visual evidence of degradation. Chemical analysis indicates 1.5% free glycol, a terephthalyl content of 67.1% and a carboxyl number of 1292. These figures indicate 87.3% conversion with the mole ratio of total glycol units to total terephthalyl units in the product being 0.99.

The low polymer product is then mixed with 6% by weight additional ethylene glycol and antimony trioxide as catalyst. Polymerization is continued at a pressure of about 1 mm. of mercury and a temperature of 285° C. to give a polymer having a relative viscosity of 16.7. Analysis of the polymer shows an ether content of 2.4 mol percent and a free carboxyl level of 23.9 equivalents per million grams. Polymer color is excellent.

EXAMPLE II

A series of experiments are carried out illustrating the process of the invention at several reactant ratios and several different temperatures. A reaction vessel similar to that illustrated in the drawing is used. Ethylene glycol and terephthalic acid are mixed in the required portions in a high speed blender and delivered continuously to inlet tube 4 by means of a metering pump which is adjusted to give the desired feed rate. No catalyst is added. Feed rates, temperature of the reaction medium, vapor removal rate, holdup time and product analyses are shown in the following Table 1.

TABLE 1

| Experiment | Reaction Conditions | | | | | | Product | | | | |
|---|---|---|---|---|---|---|---|---|---|---|---|
| | Mole ratio, reactants | Temperature, °C. | Feed rate, g./hr. | Product flow, g./hr. | Vapor withdrawn, g./hr. | Holdup time, hrs. | Carboxyl number | Percent terephthalyl | Percent free glycol | 2 G/T ratio in product | Percent conversion |
| 1 | 4/1 | 305 | 410 | 195 | 216 | 1.54 | 1,096 | 66.8 | 6.0 | 1.0 | 89 |
| 2 | 4/1 | 310 | 480 | 224 | 244 | 1.34 | 1,078 | 66.8 | 4.1 | 1.0 | 89 |
| 3 | 4/1 | 315 | 410 | 189 | 211 | 1.59 | 974 | 55.1 | 5.4 | 1.1 | 90 |
| 4 | 6/1 | 305 | 455 | 171 | 285 | 1.75 | 720 | 65.8 | 6.2 | 1.1 | 93 |
| 5 | 6/1 | 315 | 455 | 163 | 292 | 1.84 | 677 | 66.0 | 3.9 | 1.1 | 93 |
| 6 | 8/1 | 305 | 440 | 136 | 303 | 2.20 | 633 | 64.2 | 5.7 | 1.2 | 93 |
| 7 | 8/1 | 315 | 440 | 134 | 303 | 2.22 | 626 | 65.7 | 6.0 | 1.1 | 94 |

Samples of each of the low polymer products shown in Table 1 are then mixed with a small additional amount of glycol (sufficient to react with the free carboxyl ends) and a catalytic amount of antimony oxide, and then polymerized in a glass tube for 2 hrs. at 285° C. at a pressure of 0.5–2 mm. of mercury. The polymer is analyzed for relative viscosity, free carboxyl content, ether content and color with the results shown in Table 2.

To illustrate complete preparation of polymer without added catalyst, 150 grams of the low polymer product of Experiment 2, Table 1, is mixed with 8.5 ml. ethylene glycol in a three-necked, round-bottomed flask fitted with stirrer and vacuum connections. The mixture is heated and stirred for 6 hours at 300° C. under a pressure of 2 mm. Hg to give a high polymer having a relative viscosity of 20.8.

a molecular weight degradation of 1.2 relative viscosity units per hour.

For comparison, a similar film sample is pressed from polymer prepared by an ester interchange procedure using manganous acetate as a catalyst at a level of 300 parts per million manganese based on weight of polymer. After ester interchange, the bis-β-hydroxyethylterephthalate is polymerized in the presence of 100 parts per million parts of antimony added as antimony oxide under the same conditions as Sample 7 above. The film sample prepared is heated, while pressed between two sheets of metal, at a temperature of 285° C. for an extended period of time, quenched and then analyzed for polymer viscosity. This sample suffers a degradation of 2.4 relative

TABLE 2.—POLYMER PROPERTIES

| | 100 p.p.m. Sb | | | | | | 200 p.p.m. Sb | | |
|---|---|---|---|---|---|---|---|---|---|
| Experiment | Relative viscosity | Carboxyls, eq./10⁶ gm. | Ethers, mole percent | Color, L | Color, b | Whiteness Index, W | Relative viscosity | Carboxyls eq./10⁶ gm. | Ethers, mole percent |
| 1 | 10.2 | 40 | | 96 | 2.8 | 77.2 | 13.9 | 76 | 2.9 |
| 2 | 9.9 | 58 | | 97 | 3.4 | 75.0 | 14.8 | 33 | 3.1 |
| 3 | 12.3 | 27 | | 95 | 2.4 | 77.6 | 16.7 | 32 | 3.2 |
| 4 | 13.9 | 40 | 3.9 | 97 | 3.0 | 77.6 | 14.2 | 53 | 3.6 |
| 5 | 17.1 | 52 | 4.0 | 96 | 2.7 | 79.6 | 12.4 | 71 | 4.0 |
| 6 | 14.3 | 32 | 4.4 | 96 | 3.0 | 73.0 | 15.9 | 34 | 4.2 |
| 7 | 16.6 | 38 | 5.2 | 94 | 3.1 | 72.4 | 16.1 | 38 | 4.6 |

For comparison with Example II, the general procedure of Example II is repeated with the exception that the direct esterification reaction is carried out at temperatures of 280° C. and 350° C., which are outside the scope of the present invention. Reaction conditions and polymer analyses are summarized in Tables 3 and 4. The data at 280° C. show a generally slower reaction rate, with no significant improvement in polymer product. At 350° C., poor polymer quality is encountered.

Sample e in Table 4 shows, for comparison, properties of a polymer made under the same polymerizing conditions as above but derived from bis-β-hydroxyethylterephviscosity units per hour, which is twice the degradation rate shown by Sample 7 above.

EXAMPLE IV

This example illustrates a batch-wise procedure for carrying out the process of the present invention under superatmospheric pressure.

A glass polymer tube is charged with 30 parts of low molecular weight polyethylene terephthalate and 30 parts of a mixture of terephthalic acid and ethylene glycol. No catalyst is added. The tube is placed in a preheated pressure bomb and the bomb immersed in a 310° C. bath

TABLE 3

| | Reaction Conditions | | | | | | Product | | | | |
|---|---|---|---|---|---|---|---|---|---|---|---|
| Experiment | Mole ratio, reactants | Temperature °C. | Feed rate, g./hr. | Product flow, g./hr. | Vapor withdrawn, g./hr. | Holdup time, hrs. | Carboxyl number | Percent terephthalyl | Percent free glycol | 2 G/T ratio in product | Percent conversion |
| a | 4/1 | 280 | 210 | 106 | 105 | 2.83 | 868 | 60.5 | 5.0 | 1.4 | 90 |
| b | 6/1 | 280 | 390 | 148 | 242 | 2.02 | 679 | 64.3 | 2.7 | 1.2 | 93 |
| c | 8/1 | 280 | 440 | 136 | 302 | 2.20 | 639 | 62.9 | 3.1 | 1.3 | 93 |
| d | 4/1 | 350 | 460 | 199 | 265 | 1.25 | 1,335 | 64.7 | 2.29 | 1.03 | 86.4 |

TABLE 4.—POLYMER PROPERTIES

| | 100 p.p.m. Sb | | | | | | 200 p.p.m. Sb | | |
|---|---|---|---|---|---|---|---|---|---|
| Experiment | Relative viscosity | Carboxyls, eq./10⁶ gm. | Ethers, mole percent | Color, L | Color, b | Whiteness Index, W | Relative viscosity | Carboxyls eq./10⁶ gm. | Ethers, mole percent |
| a | 18.3 | 18 | | 96 | 2.6 | 77.5 | 15.4 | 20 | 4.0 |
| b | 15.9 | 27 | 3.5 | 95 | 2.7 | 75.5 | 11.7 | 32 | 3.7 |
| c | 12.5 | 24 | 4.6 | 96 | 2.1 | 81.2 | 14.6 | 30 | 3.8 |
| d | 17.1 | 86 | 3.47 | 89.5 | 7.5 | 41.8 | 23.3 | 42.2 | 3.95 |
| e | 14.7 | 31.7 | 2.2 | 95 | 3.0 | 73.0 | 22.1 | 36 | 2.2 | thalate made by an ester interchange process using manganous acetate as the exchange catalyst.

EXAMPLE III

This example illustrates the improved thermal stability of the polymer prepared from the process of this invention.

The polymer of Run No. 7 in Example II is melt-pressed into a film of 28 mils (0.71 mm.) thickness at 285° C. The sample is heated, while pressed between two sheets of metal, at a temperature of 285° C. for an extended period of time and then quenched and analyzed for polymer viscosity. It is found that the sample suffers for the time indicated in Table 5 below. Pressure in the bomb is maintained at about 60 p.s.i.g. by periodically bleeding off excess glycol and water vapor through a relief valve. Antimony oxide is then added and mixed with the product of the reaction in the ratio of 100 parts of antimony per million parts of product by weight and the mixture is polymerized at 285° C. under 2 mm. mercury pressure. After polymerizing for 2 hrs., the polymer is analyzed for relative viscosity, free carboxyl content and ether content. The reaction conditions of the direct esterification reaction and analyses of the product are shown in Tables 5 and 6 below.

TABLE 5

| Experiment | Reaction conditions | | Prepolymer analyses | | | | |
| --- | --- | --- | --- | --- | --- | --- | --- |
| | Glycol/TPA, mole ratio | Reaction time, minutes | Carboxyl number | Percent terephthalyl | Percent free glycol | 2 G/T | Percent conversion |
| 11 | 4/1 | 18 | 76 | 60.7 | 1.7 | 1.4 | 99 |
| 12 | 6/1 | 16 | 599 | 53.5 | 1.2 | 1.8 | 93 |
| 13 | 8/1 | 21 | 240 | 60.7 | 1.2 | 1.4 | 97 |

TABLE 6.—POLYMER ANALYSES

| Experiment | Relative viscosity | Carboxyls, ex./10 gm. | Ethers, mole percent |
| --- | --- | --- | --- |
| 11 | 16.6 | 34 | 4.2 |
| 12 | 16.9 | 30 | 8.0 |
| 13 | 18.6 | 22 | 5.4 |

The invention has been illustrated particularly with respect to the use of terephthalic acid and ethylene glycol as reactants. It can also be used to prepare polyesters from other acids and other glycols. For example, instead of terephthalic acid other acids may be used. Representative examples of other acids are isophthalic acid, orthophthalic acid, naphthalene-2,6-dicarboxylic acid, hexahydroterephthalic acid, bibenzoic acid, and the like. Mixtures of acids may be used.

The process of the present invention provides a fast and convenient method of directly esterifying terephthalic acid with glycol to give a low polymer product which is easily polymerized to high quality fiber and film-forming polyester. The process is conducted in the absence of an esterification catalyst, thereby eliminating all of the disadvantages associated with the presence of catalytic amounts of certain metals. Furthermore, the heat stability of the polymer produced is considerably better than that derived from a process involving ester exchange.

Since many different embodiments of the invention may be made without departing from the spirit and scope thereof, it is to be understood that the invention is not limited by the specific illustrations except to the extent defined in the following claims.

What is claimed is:

1. In the process for the manufacture of glycol-terephthalate linear polyesters by direct esterification of terephthalic acid with a glycol followed by condensation polymerization of the ester to high molecular weight, fiber-forming polymer, and wherein esterification and preliminary polymerization to low molecular weight polyester reaction product are carried out in a combined step; the improvement for conducting said combined step at a high rate with high conversion of the terephthalic acid to polyester suitable for further polymerization to fiber-forming polymer of excellent color, low ether content and low free carboxyl content; wherein the improvement comprises continuously feeding a slurry of terephthalic acid in glycol into a reactor containing low molecular weight polyester reaction product maintained at about 303° to 330° C. and withdrawing said reaction product as polyester having an average degree of polymerization of 6 to 20 at a rate providing a holdup time of 0.5 to 2 hours in the reactor, based on the terephthalic acid feed rate and amount of material in the reactor, the mole ratio of glycol to terephthalic acid fed to the reactor being from 1:1 to 8:1 with excess glycol being removed by distillation.

2. The process defined in claim 1 wherein the low molecular weight polyester is maintained at 305° to 315° C. and the pressure in the reactor is substantially atmospheric.

3. The process defined in claim 1 wherein the low molecular weight polyester is maintained at 315° to 330° C. and a pressure of up to 60 pounds per square inch gage pressure is maintained in the reactor.

References Cited

FOREIGN PATENTS 1,001,787 8/1965 Great Britain.
1,381,018 10/1964 France.
1,385,058 10/1964 France.

WILLIAM H. SHORT, Primary Examiner

L. L. LEE, Assistant Examiner